J. COATES.
BEE-HIVE
No. 189,923.        Patented April 24, 1877.
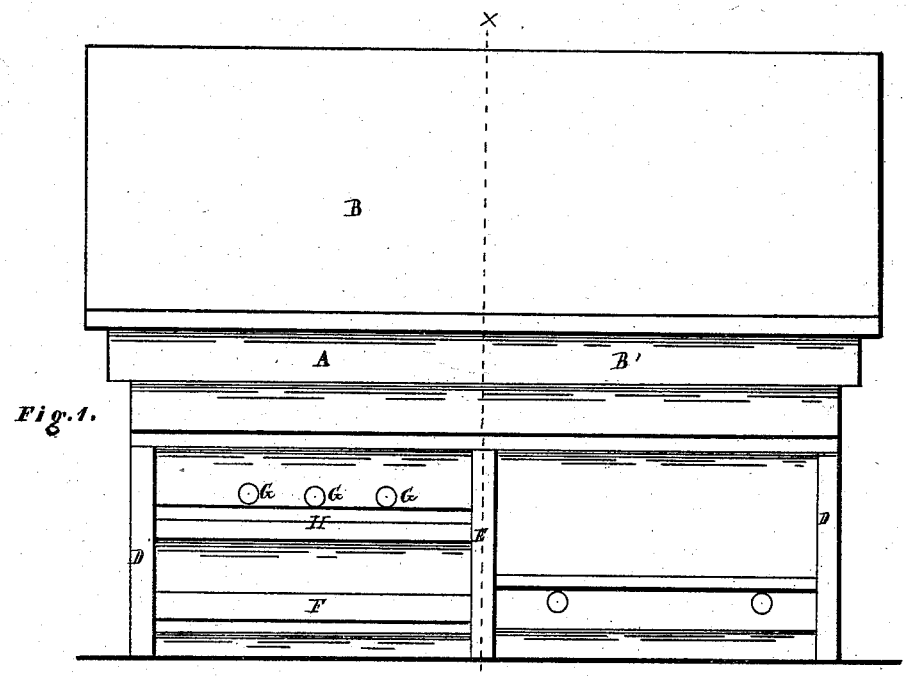
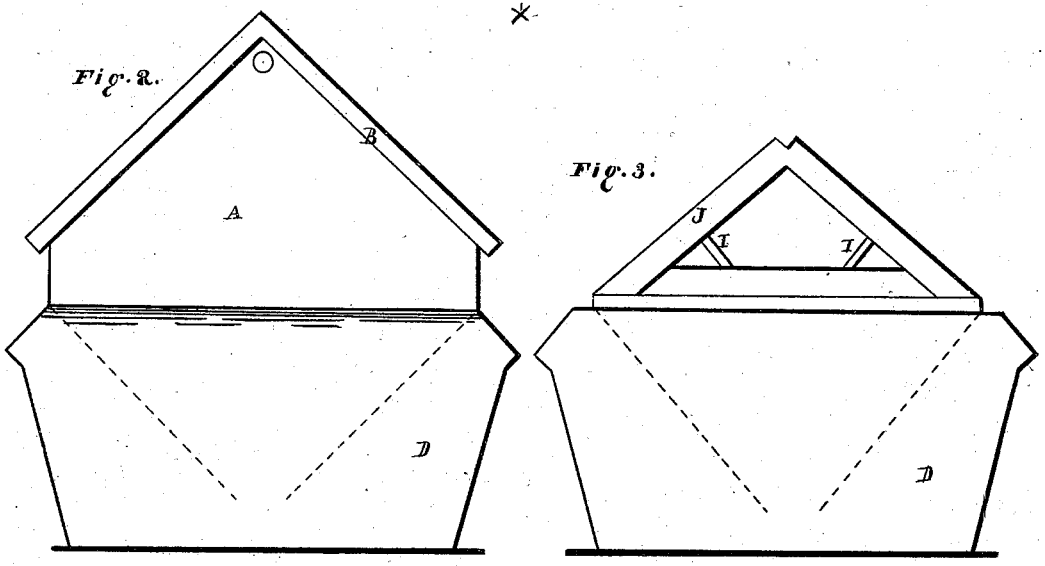

J. COATES.
BEE-HIVE.
No. 189,923. Patented April 24, 1877.
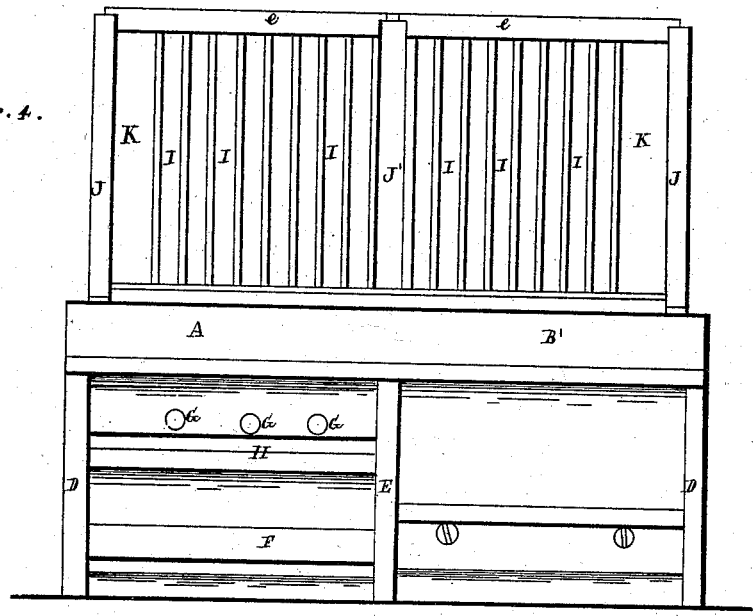
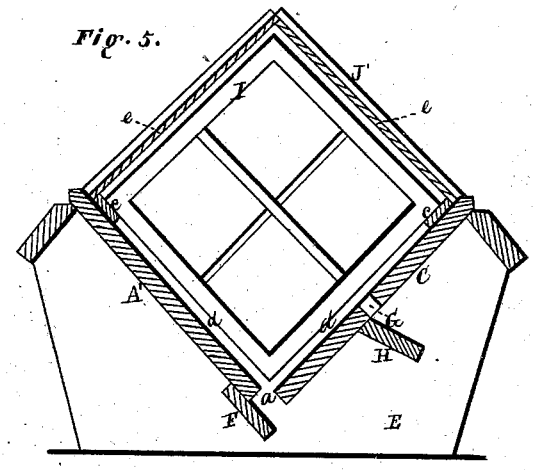
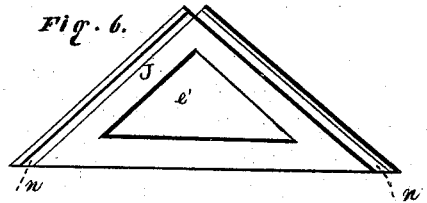

UNITED STATES PATENT OFFICE.

JOHN COATES, OF CAMDON, OHIO.

IMPROVEMENT IN BEE-HIVES.

Specification forming part of Letters Patent No. 189,923, dated April 24, 1877; application filed September 25, 1876.

*To all whom it may concern:*

Be it known that I, JOHN COATES, of Camdon, in the county of Lorain and State of Ohio, have invented new and useful Improvements in Bee-Hives, of which the following is a description, reference being had to the accompanying drawings, making a part of this specification, in which—

Figure 1 is a side view of the hive. Fig. 2 is an end view. Fig. 3 is an end view with the roof removed. Fig. 4 is a side view with the roof removed. Fig. 5 is a transverse section. Fig. 6 is a detached section.

Like letters of reference refer to like parts in the several views presented.

The nature of this invention relates to a bee-hive, the peculiar construction of which is such that the hive is self-cleaning. The droppings and waste from the frames fall down to the bottom, from whence it can be readily removed by the bees or by the apiarist; also, the construction of the hive is such that the bees have full and free access to all parts thereof, hence there is no place to harbor bee-moth, worms, &c., inaccessible to the bees; furthermore, the hive is such that the honey-frames can be removed without much disturbance of the bees, and which also dispenses with the uses of honey-boxes on the outside of the hive, said boxes being used on the inside with the honey-frames. A more full and complete description of the hive is as follows, the same being an improvement of a hive for which a patent was granted to me October 29, 1867, No. 70,167.

In the drawings, A represents the body of the hive, of which B is the cover or roof. Said body consists of two sides, A' C, Fig. 5, set at right angles, forming a V-shape receptacle, supported by the ends D and partition E. It will be observed that the sides do not touch each other at the bottom, there being left a space, $a$, Fig. 5, between them, forming a doorway along the bottom of the hive for the bees, and provided with an alighting-board, F; also, the bees have access to the hive through the side doors or openings G, of which H is the alighting-board.

In the body of the hive are arranged the frames I, Figs. 4 and 5. Said frames are suspended therein on cleats $c$, Fig. 5, along the upper edge of the sides A' C. In thus suspending the frames in the hive they are prevented from touching the sides thereof, there being a space between the frames and the sides, as will be seen at $d$ in Fig. 5, for the passage of the bees up around and between the frames. Immediately over said frames is a covering of glass. An edge view of the plates of glass is shown at $e$, Fig. 5; also shown in Fig. 4, through which the frames are seen. The plates of glass are secured in place in grooves made in the pieces J J', wherein they slide for being removed. The middle piece J' forms a partition, thereby making of the structure two hives, A B', Figs. 1 and 4, the one a duplicate of the other, differing only in having the bee-doors G on opposite sides, to prevent confusion of the bees.

The pieces or gables J are detachable, for the convenience of removing the frames. A detached view of one of said gables is shown in Fig. 6, in which $n$ are the grooves for the glass. Said gable-ends are provided with a glass center, $e'$, through which to view the upper part of the hive and the frames therein. The ends of the body of the hive may be provided with windows, for inspecting the lower part of the frames, and which may also be detachable, so that the frames may be removed from the end of the hive instead of being lifted therefrom from the top.

Over the glass covering is placed the roof B, for shading the hive and protecting the same from storms, &c.

The hive or hives above described is simple in its construction and convenient of access for the bees, which find their way in through door $a$ at the bottom, and the side doors G, there being ample room between the lower part of the frames and the sides of the hive, and the upper part of the frames and the glass covering, to allow the bees to pass all around the frames, enabling them to discover and dislodge bee-moth and other insects that may have found their way into the hive.

The position of the hive is such that the droppings and waste from the frames fall upon the inclined sides A' C, down which it slides to the beeway $a$ at the bottom, from which it can be easily removed by the bees or by the apiarist.

In the event a honey-box is needed for the bees to work in, it can be placed in the hive by the side of the frames, as will be seen at K in Fig. 4. Said box is simply a frame of greater depth than the frames I. This honey-box or frame being placed near the end of the hive, can be readily removed therefrom without much disturbing the bees. This extra frame or honey-box may be placed on the top of the hive, if so desired. To this end the glass covering the place on which the box is to stand must be removed to give the bees access to the box.

What I claim as my invention, and desire to secure by Letters Patent, is—

In bee-hives, the detachable ends or gables J J, provided with grooves $n\ n$, for the admission and removal of the glass covering $e$, in combination with the sides A' C of the hive, frames I, and roof B, in the manner substantially as set forth, and for the purpose specified.

JOHN COATES.

Witnesses:
J. H. BURRIDGE,
R. M. RAY.